Patented Mar. 26, 1935

1,995,710

UNITED STATES PATENT OFFICE 1,995,710

HYDROXYPHENYLALPHAOXIMINOALKYL KETONE AND THE METHOD OF PREPARING SAME

Walter H. Hartung, Baltimore, Md., assignor to Sharp & Dohme, Incorporated, Philadelphia, Pa., a corporation of Maryland No Drawing. Application September 22, 1931, Serial No. 564,475

18 Claims. (Cl. 260—128.5)

This invention relates to the new hydroxyphenylalphaoximinoalkyl ketones including the mono and dihydroxy compounds and more particularly those compounds which contain an hydroxy group in the 4- or the 2-position. The invention includes both the method of producing the new products as well as the new products themselves.

According to this invention hydroxyphenylalkyl ketones are nitrosated with butyl nitrite in the presence of an acid. Although the use of butyl nitrite in the nitrosation of ketones is not new, it has not hitherto been realized that a nitrogen group can be introduced into the alpha carbon of the alkyl group of an hydroxyphenylalkyl ketone without nitrating the phenyl ring.

In this manner I have produced the new ketones of this invention which have the general formula $HO.C_6H_3(X).CO.C(NOH)R$ where X may be hydrogen or an hydroxy group and R is an alkyl group, more particularly the following:

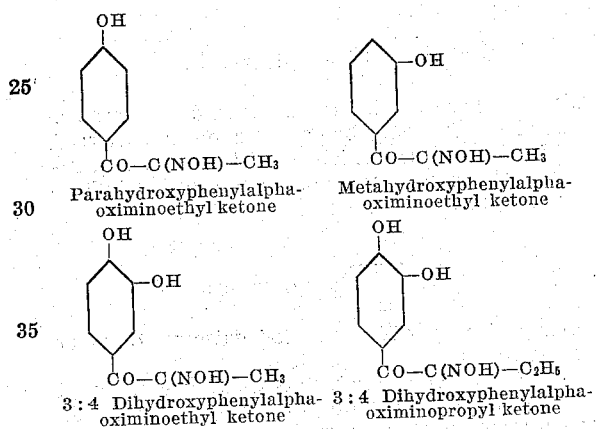

Parahydroxyphenylalpha-oximinoethyl ketone
Metahydroxyphenylalpha-oximinoethyl ketone
3:4 Dihydroxyphenylalpha-oximinoethyl ketone
3:4 Dihydroxyphenylalpha-oximinopropyl ketone These ketones are valuable as intermediates in the production of the corresponding amino alcohols, certain of which have been found to have valuable therapeutic properties and are claimed as new in my co-pending application Serial No. 564,473, filed September 22, 1931.

In preparing the ketones of this invention the hydroxyphenylalkyl ketone is brought into solution or suspension in a suitable solvent such as ether and the nitrosation is advantageously effected by adding butyl nitrite slowly to the solution or suspension while bubbling hydrogen chloride gas thru it.

The following examples will serve to illustrate the process:

*Example 1.*—Parahydroxyphenylalphaoximino ketone is prepared from parahydroxyphenylethyl ketone by reacting with butyl nitrite. 90 parts of the ketone are dissolved or suspended in about 400 parts of ether. Hydrogen chloride is slowly bubbled thru the solution or suspension while agitating it, and 61.8 parts butyl nitrite are added during the course of 60 to 90 minutes. During the addition of the butyl nitrite the suspended parahydroxyphenylethyl ketone gradually dissolves. The solution is allowed to stand for at least an hour, but preferably over night, when it is repeatedly extracted with dilute alkali until all alkali soluble material is removed.

The alkaline extract is slowly acidified. The precipitate which forms is crude parahydroxyphenyloximinoethyl ketone, which after recrystallization from water melts at 185° C. This is a new product.

*Example 2.*—Metahydroxyphenylalphaoximinoethyl ketone is prepared from metahydroxyphenylethyl ketone by the reaction with butyl phenylethyl ketone by the reaction with butyl nitrite of 90 parts of the ketone dissolved or suspended in about 400 parts of ether. Hydrogen chloride is slowly bubbled thru the solution or suspension while agitating it and 61.8 parts of butyl nitrite are added during the course of sixty to ninety minutes. During the addition of the butyl nitrite the suspended metahydroxyphenylethyl ketone gradually dissolves. The solution is allowed to stand for at least an hour, but preferably over night. It is then repeatedly extracted with dilute alkali until all the alkali-soluble material is removed. The alkaline extract is then slowly acidified. The crude metahydroxyphenyloximinoethyl ketone precipitates. This is recrystallized from water and the pure compound melts at 138° C. This is a new product.

*Example 3.*—3,4 - dihydroxyphenylalphaoximinoethyl ketone is prepared by dissolving or suspending 32.8 parts of 3,4-dihydroxyphenylethyl ketone in about 125 parts by weight of ether. The solution is stirred while dry hydrogen chloride is bubbled into it slowly at the rate of two to three bubbles per second for every 175 cc. of ether and an equimolecular proportion of butyl nitrite, namely 20.6 parts, are added during the course of 30 or 40 minutes. The reaction mixture is allowed to stand an additional sixty to ninety minutes and the ether is then evaporated. The residue is taken up in hot water and the solution boiled with decolorizing charcoal and filtered hot. The crystals which settle out on cooling are filtered off, dried and then boiled successively with two portions of benzol, about 150 parts, and then 105 parts by weight, respectively, to remove non-nitrosated ketone. Another treatment with charcoal and recrystallization results in almost white crystals which melt with decomposition at 217° C. This product is 3,4-dihydroxyphenylalphaoximinoethyl ketone. It is a new product not hitherto known.

Example 4.—3,4 - dihydroxyphenylalphaoximinopropyl ketone is prepared as follows: 32.8 parts of 3,4-dihydroxyphenylpropyl ketone are dissolved or suspended in about 125 parts by weight of ether. The solution is stirred while dry hydrogen chloride is bubbled into it slowly at the rate of two or three bubbles per second for every 175 cc. of ether and 20.6 parts of butyl nitrite are added during the course of 30 or 40 minutes. The reaction mixture is allowed to stand an additional sixty to ninety minutes and the ether is then evaporated. The residue is taken up in hot water and the solution boiled with decolorizing charcoal and filtered hot. The crystals which settle out on cooling are filtered off, dried and then boiled successively with about 150 parts by weight of benzol and then with about 105 parts by weight of benzol to remove non-nitrosated ketone. Another treatment with charcoal and recrystallization from water results in crystals which melt at 167° C. This product is 3,4-dihydroxyphenylalphaoximinopropyl ketone. It is a new product.

This application is in part a continuation of my co-pending application Serial No. 360,005, filed May 2, 1929 and Serial No. 431,343, filed February 25, 1930.

I claim:

1. The method of nitrosating the alpha carbon atom in the alkyl group of a ketone of the group consisting of para and meta hydroxyphenylalkyl ketones, which comprises reacting the same in solution in an organic solvent with butyl nitrite in the presence of hydrogen chloride.

2. The method of nitrosating the alpha carbon atom of the alkyl group of a 3,4-dihydroxyphenylalkyl ketone, which comprises reacting the same with nitrous acid formed from butyl nitrite.

3. The method of nitrosating the alpha carbon atom of the alkyl group of a 3,4-dihydroxyphenylalkyl ketone, which comprises reacting the same in solution in an organic solvent with nitrous acid formed by butyl nitrite.

4. The method of preparing 3,4-dihydroxyphenylalphaoximinoethyl ketone from 3,4-dihydroxyphenylethyl ketone, which comprises dissolving the latter in an organic solvent and effecting reaction with butyl nitrite in the presence of hydrogen chloride.

5. The method of preparing 3,4-dihydroxyphenylalphaoximinopropyl ketone, which comprises dissolving 3,4-dihydroxyphenylpropyl ketone in an organic solvent and effecting reaction with butyl nitrite in the presence of hydrogen chloride.

6. The method of preparing 3,4-dihydroxyphenylalphaoximinoalkyl ketones from 3,4-dihydroxyphenylalkyl ketones, which comprises dissolving the latter in ether, bubbling hydrogen chloride thru the solution and gradually adding an equimolecular proportion of butyl nitrite thereto allowing the reaction mixture to stand, and then evaporating the ether and purifying the product.

7. The method of nitrosating the alphacarbon atom of the alkyl group of a ketone, of the group consisting of para and meta monohydroxyphenylalkyl ketones, which comprises reacting the same with nitrous acid formed from butyl nitrite.

8. The method of preparing parahydroxyphenylalphaoximinoethyl ketone from parahydroxyphenylethyl ketone, which comprises dissolving the latter in an organic solvent and effecting reaction with butyl nitrite in the presence of hydrogen chloride.

9. The method of preparing a ketone of the group consisting of para and meta monohydroxyphenylalphaoximinoalkyl ketones, which comprises suspending or dissolving the corresponding monohydroxyphenylalkyl ketone in ether, gradually adding an equimolecular weight of butyl nitrite while bubbling hydrogen chloride thru the suspension, and thereafter extracting with an alkali.

10. As new products ketones having the formula $HO—C_6H_3(X)—CO—C(NOH)R$ where the OH group is in the 3 or 4 position, X may be hydrogen or an hydroxy group and R is an alkyl group.

11. As a new product 3,4-dihydroxyphenylalphaoximinoethyl ketone.

12. As a new product 3,4-dihydroxyphenylalphaoximinoalkyl ketone.

13. As a new product parahydroxyphenylalphaoximinoethyl ketone.

14. The process which consists in causing butyl nitrite and a strong non-oxidizing mineral acid to act upon 3,4-dihydroxypropiophenone.

15. The process which consists in causing nitrous acid to act upon a compound of the following formula

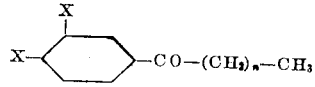

where at least one X stands for hydroxy and the other for hydrogen, n being 1 or a multiple thereof.

16. The process which consists in causing nitrous acid to act upon a compound of the following formula

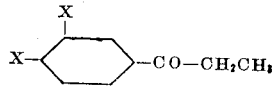

where at least one X stands for hydroxy, the other for hydrogen.

17. The process which consists in causing butyl nitrite and a strong non-oxidizing mineral acid to act upon parahydroxypropiophenone.

18. The process which consists in causing butyl nitrite and a strong non-oxidizing mineral acid to act upon metahydroxypropiophenone.

WALTER H. HARTUNG.

CERTIFICATE OF CORRECTION.

Patent No. 1,995,710. March 26, 1935.

WALTER H. HARTUNG.

It is hereby certified that error appears in the printed specification of the above numbered patent requiring correction as follows: Page 2, first column, line 48, claim 3, for "by" read from; and that the said Letters Patent should be read with this correction therein that the same may conform to the record of the case in the Patent Office.

Signed and sealed this 28th day of May, A. D. 1935.

Leslie Frazer (Seal) Acting Commissioner of Patents.